United States Patent [19]
Dufner et al.

[11] Patent Number: 6,024,848
[45] Date of Patent: Feb. 15, 2000

[54] ELECTROCHEMICAL CELL WITH A POROUS SUPPORT PLATE

[75] Inventors: Bryan Franz Dufner, West Hartford, Conn.; Richard David Breault, North Kingstown, R.I.

[73] Assignee: International Fuel Cells, Corporation, South Windsor, Conn.

[21] Appl. No.: 09/060,583

[22] Filed: Apr. 15, 1998

[51] Int. Cl.[7] .............................. C25B 9/00; H01M 8/10; H01M 2/14

[52] U.S. Cl. .......................... 204/252; 204/263; 204/283; 429/33; 429/39

[58] Field of Search ..................................... 204/283, 252, 204/254–258, 263–266; 429/34–40

[56] References Cited

U.S. PATENT DOCUMENTS

| | | | |
|---|---|---|---|
| 4,038,463 | 7/1977 | Larmarine et al. | 429/44 |
| 4,345,008 | 8/1982 | Breault | 429/26 |
| 4,826,742 | 5/1989 | Reiser | 429/33 |
| 5,372,689 | 12/1994 | Carlson et al. | 204/283 X |
| 5,480,735 | 1/1996 | Landsman et al. | 429/13 |
| 5,650,058 | 7/1997 | Wenske et al. | 204/283 X |

*Primary Examiner*—Donald R. Valentine
*Attorney, Agent, or Firm*—Malcolm J. Chisholm, Jr.

[57] ABSTRACT

An improved electrochemical cell such as a fuel cell is disclosed including a porous support plate for enhancing transport of fluids throughout the cell and for enhancing capacitance and transient response capability of the cell. The electrochemical cell includes an electrolyte having opposed major surfaces with an anode and a cathode electrode supported in intimate contact with the opposed major surfaces. A porous support plate is secured adjacent each electrode, and each porous support plate includes a contact bi-layer in intimate contact with the electrode. Each contact bi-layer is comprised of a hydrophobic phase including a mixture of carbon black and a hydrophobic polymer defining a network of hydrophobic gas passages and each contact bi-layer also includes a hydrophilic phase including a mixture of carbon black and a proton exchange resin defining a network of hydrophilic liquid passages integrated throughout the contact bi-layer. Each porous support plate also includes a porous substrate layer adjacent and supporting the contact bi-layer. A method of manufacture of the porous support plate includes the steps of preparing a hydrophobic phase compound, preparing a hydrophilic phase compound, mixing and filtering the two compounds to form a contact bi-layer, transferring the contact bi-layer onto a porous substrate layer to form a porous support plate. An alternative method includes an additional step of activating the contact bi-layer in an acid bath at controlled electrical potentials to enhance capacitance of the cell.

14 Claims, 4 Drawing Sheets

ELECTROCHEMICAL CELL WITH A POROUS SUPPORT PLATE

TECHNICAL FIELD

The present invention relates to electrochemical cells such as stacks of electrochemical cells used in fuel or electrolysis cells, and especially relates to a fuel cell having improved fluid transport, improved capacitance and improved transient response capability for use in transport vehicles.

BACKGROUND OF THE INVENTION

Electrochemical cells are commonly used in a fuel cell configuration to produce electrical energy from reducing and oxidant fluids, or in an electrolysis cell configuration to produce product gases from a supply fluid such as producing hydrogen and oxygen gas from water. Typical applications employ a plurality of planar cells arranged in a stack surrounded by an electrically insulating frame that defines manifolds for directing flow of reactant and product fluids. Electrochemical cells generally include an anode electrode and a cathode electrode separated by an electrolyte. Enhancing uniformity of distribution and rates of transport of oxidizing, reducing and product fluids from surfaces of the electrodes and throughout the cells increases operating efficiencies of electrochemical cells.

For example, a well-known use of such electrochemical cells is in a stack for a fuel cell. A reducing fluid such as hydrogen is supplied to the anode electrode, and an oxidant such as oxygen or air is supplied to the cathode electrode. The hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One common electrolyte is a "proton exchange membrane" (hereafter "PEN") which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed by evaporation or entrainment into a circulating gaseous stream of reducing or oxidant fluids, or by capillary action into and through a porous fluid transport layer adjacent the cathode. Porous water transport plates supply liquid water from a supply of coolant water to the anode electrode and remove water from the cathode electrode back to the coolant water supply, and thereby serve to remove heat from the electrolyte and electrodes. It is critical that a proper water balance be maintained between a rate at which water is produced at the cathode electrode and rates at which water is removed from the cathode and at which liquid water is supplied to the anode electrode. An operational limit on performance of such a PEM fuel cell is defined by an ability of the cell to maintain the water balance as electrical current drawn from the cell into the external load circuit increases. If insufficient water is returned to the anode electrode, adjacent portions of the PEM electrolyte dry out thereby decreasing the rate at which hydrogen ions may be transferred through the PEM. Similarly, if insufficient water is removed from the cathode, the cathode electrode may become flooded effectively limiting oxidant supply to the cathode and hence decreasing current flow.

An additional design limitation of known fuel cells is that a maximum current demand for operation of a load or system that the fuel cell powers generally defines overall size, weight and cost requirements of the fuel cell. For example, to power a mobile vehicle such as an automobile, a fuel cell must be able to satisfy a momentary surge or transient peak in electrical current demand triggered by such activities as sudden, short duration acceleration. Known fuel cells however, have a limited inherent capacitance, and therefore satisfy such a momentary or transient peak in demand by establishing a continuous operating current at a level that is capable of meeting such transient demands, or by using batteries to supplement the current capacity of the fuel cell. Therefore the size, weight and related cost of the electrical current generation system must increase substantially only to satisfy transient demands because the fuel cell lacks adequate capacitance to satisfy short-term increased power demands.

Fuel cell development has endeavored to enhance fluid transport throughout a cell and to thereby decrease weight and cost requirements to meet specific operating demands. For example, in a typical fuel cell the anode and cathode electrodes comprise thin, porous catalyst layers supported by porous support layers in intimate contact with opposed major surfaces of an electrolyte such as a PEM. Water, reducing and oxidant fluids move to, through and away from the catalyst layers through the pores of the support layers. In order to prevent liquid water from blocking movement of gaseous fluids through the support layer pores, it is known to treat the support layer with hydrophobic substances such as hydrophobic polymers. Such a hydrophobic support layer facilitates transport of gaseous reactants, reducing and product fluids, while water moves through the support layer as vapor. Additionally, to minimize excess accumulation of liquid water at the cathode thereby restricting access of the gaseous oxidant to the cathode electrode, it is also known to use porous, carbonized, wetproofed sheets adjacent the cathode, as shown in U.S. Pat. No. 4,826,742 to Reiser that issued on May 2, 1989 and is assigned to the assignee of the invention disclosed herein. Further fuel cell development includes use of hydrophobic substances integrated within a catalyst layer on a porous support layer in an alkaline electrolyte fuel cell to establish a network of hydrophobic gas passages communicating with the catalyst particles making up the electrode and simultaneous use of hydrophilic catalytically inactive particles within the same catalyst layer to form liquid transport pathways, as shown in U.S. Pat. No. 5,480,735 to Landsman et al. that issued on Jan. 2, 1996 and is assigned to the assignee of the present invention. It is also known to add porous water transport plates adjacent the support layers to facilitate liquid water transport and cooling throughout the cell; to integrate a humidifying component to add moisture to the gaseous reducing or oxidant fluids entering the cell to limit a possibility of drying out of the electrodes and an adjacent PEM; to integrate a condensing loop external to the cell to condense moisture within an exiting oxidant stream such as by a heat exchange relationship with ambient air and to then return the condensed moisture to the porous support layers adjacent the anode electrode; to render a portion of a phosphoric acid electrolyte electrochemically inactive in a phosphoric acid cell and thereby form a condensation zone adjacent an oxidant gas outlet which zone operates at a cooler temperature than the active portions of the electrolyte to thereby limit electrolyte loss (as shown in U.S. Pat. No. 4,345,008 to Breault and assigned to the assignee of the present invention); and to generate a pressure differential on the anode side of the cell wherein the reducing gas is maintained at a slightly higher pressure than coolant water and anode supply water passing through porous support layers adjacent reducing gas distribution channels so that the pressure differential assists water transport through the porous support layers and cell.

While such improvements have enhanced fuel cell efficiencies, PEM fuel cells in particular still suffer operational limits such as upon peak current demand wherein the cathode electrode becomes flooded and the membrane of the PEM adjacent the anode catalyst layer drys out, thereby limiting available current output capacity of the cell. Accordingly there is a need for a fuel cell having components that increase capacitance and enhance fluid transport throughout the cell thereby maintaining a proper water balance within the cell resulting in increased continuous and transient current output capacity without a proportionate increase in size, weight and cost of the cell.

DISCLOSURE OF THE INVENTION

An improved electrochemical cell such as a fuel cell is disclosed including a porous support plate for efficiently producing electrical energy from reducing and oxidant fluids. In a preferred embodiment, the electrochemical cell includes an electrolyte such as a proton exchange membrane ("PEM") having opposed first and second major surfaces, an anode electrode supported in intimate contact with the first major surface of the PEM, and a cathode electrode supported in intimate contact with the second major surface. A porous support plate is secured adjacent each electrode, and each porous support plate includes a contact bi-layer in intimate contact with the electrode, wherein the contact bi-layer is comprised of a hydrophobic phase including a mixture of carbon black and a hydrophobic polymer defining a network of hydrophobic gas passages and a hydrophilic phase including a mixture of carbon black and a proton exchange resin defining a network of hydrophilic liquid passages integrated throughout the contact bi-layer, and each porous support plate also includes a substrate layer adjacent and supporting the contact bi-layer.

In use of the electrochemical cell having a porous support plate, a gaseous reducing fluid such as hydrogen and liquid water are directed into the substrate layer of the porous support plate on the anode side of the PEM, while a gaseous oxidant such as oxygen or air is directed into the substrate layer of the porous support plate on the cathode side of the PEM. An electrical current is generated by the electrodes and passes out of the cell through an external load circuit in a well-known manner. The hydrophobic phase of the contact bi-layers facilitates gas transfer and restricts liquid water absorption through the hydrophobic gas passages. The hydrophilic phase of the contact bi-layers facilitates transfer of the liquid water through the contact bi-layers through usage of a high surface area carbon support and inherent wettability characteristics of the proton exchange resin which combine to define the hydrophilic liquid passages. The carbon and the proton exchange resin of the hydrophilic phase also combine to increase capacitance of the fuel cell. In an alternative preferred embodiment, the substrate layer of the porous support plate includes discrete hydrophobic and hydrophilic regions to further enhance fluid transport throughout the cell.

A method of manufacture of the porous support plate that enhances fluid transport and capacitance of the cell is also disclosed. The method includes the steps of preparing a hydrophobic phase compound, preparing a hydrophilic phase compound, mixing and filtering the two compounds to form a contact bi-layer, transferring the contact bi-layer onto a porous substrate layer, and heat treating the transferred contact bi-layer and substrate layer to form a porous support plate. An alternative preferred method includes an additional step of activating the contact bi-layer in an acid bath at controlled potentials for specific periods of time to enhance capacitance of the cell.

Accordingly, it is a general object of the present invention to provide an electrochemical cell with a porous support plate that overcomes deficiencies of prior art electrochemical cells.

It is a more specific object to provide an electrochemical cell with a porous support plate that enhances fluid transport throughout the cell.

It is another specific object to provide an electrochemical cell with a porous support plate that increases capacitance of the cell.

The above and other objects and advantages of this invention will become more readily apparent when the following description is read in conjunction with the accompanying drawings.

DESCRIPTION OF THE PREFERRED EMBODIMENTS

Figure 1:
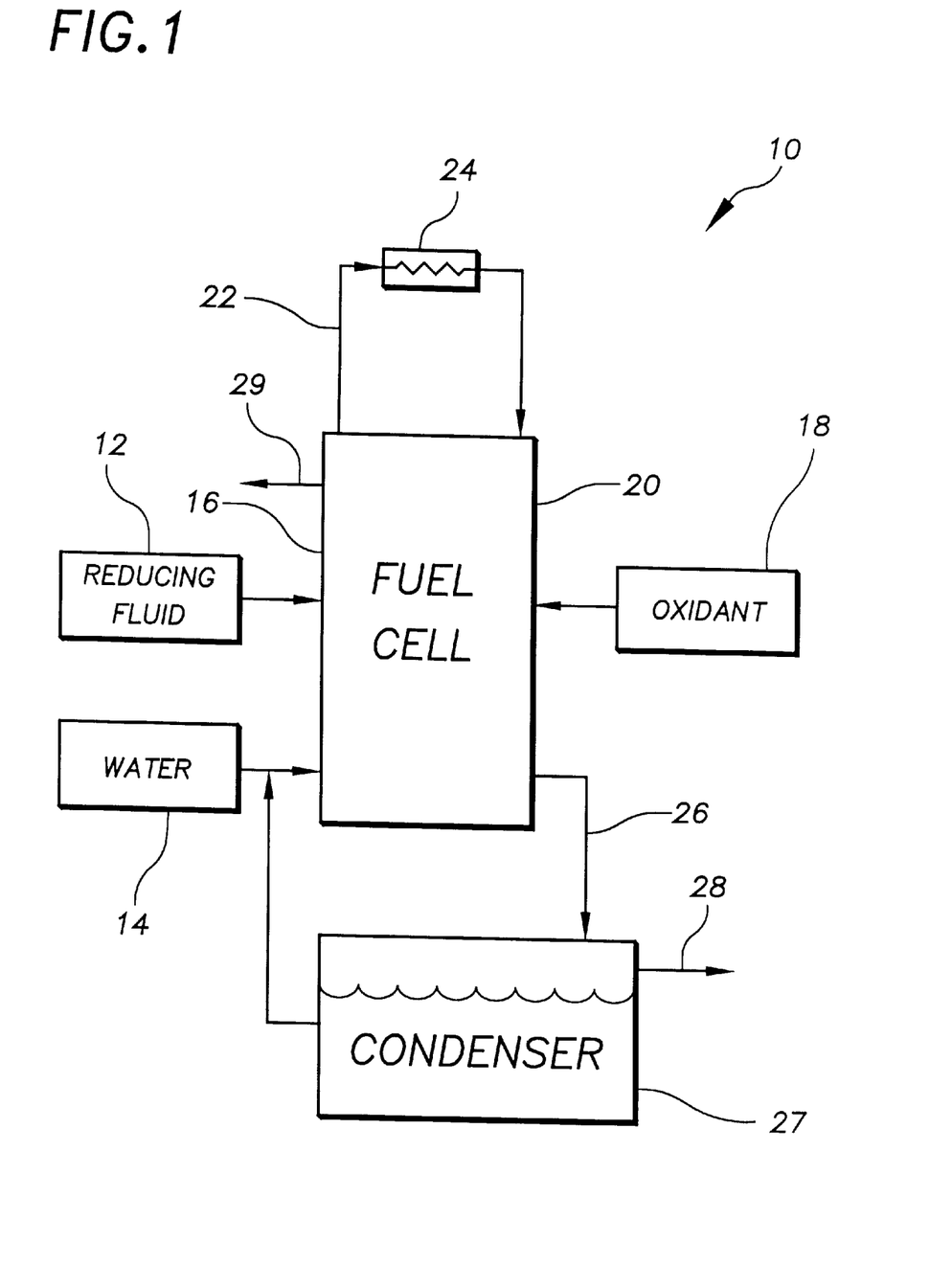
FIG. 1 is a schematic representation of operation of a fuel cell to produce electrical energy.
Figure 2:
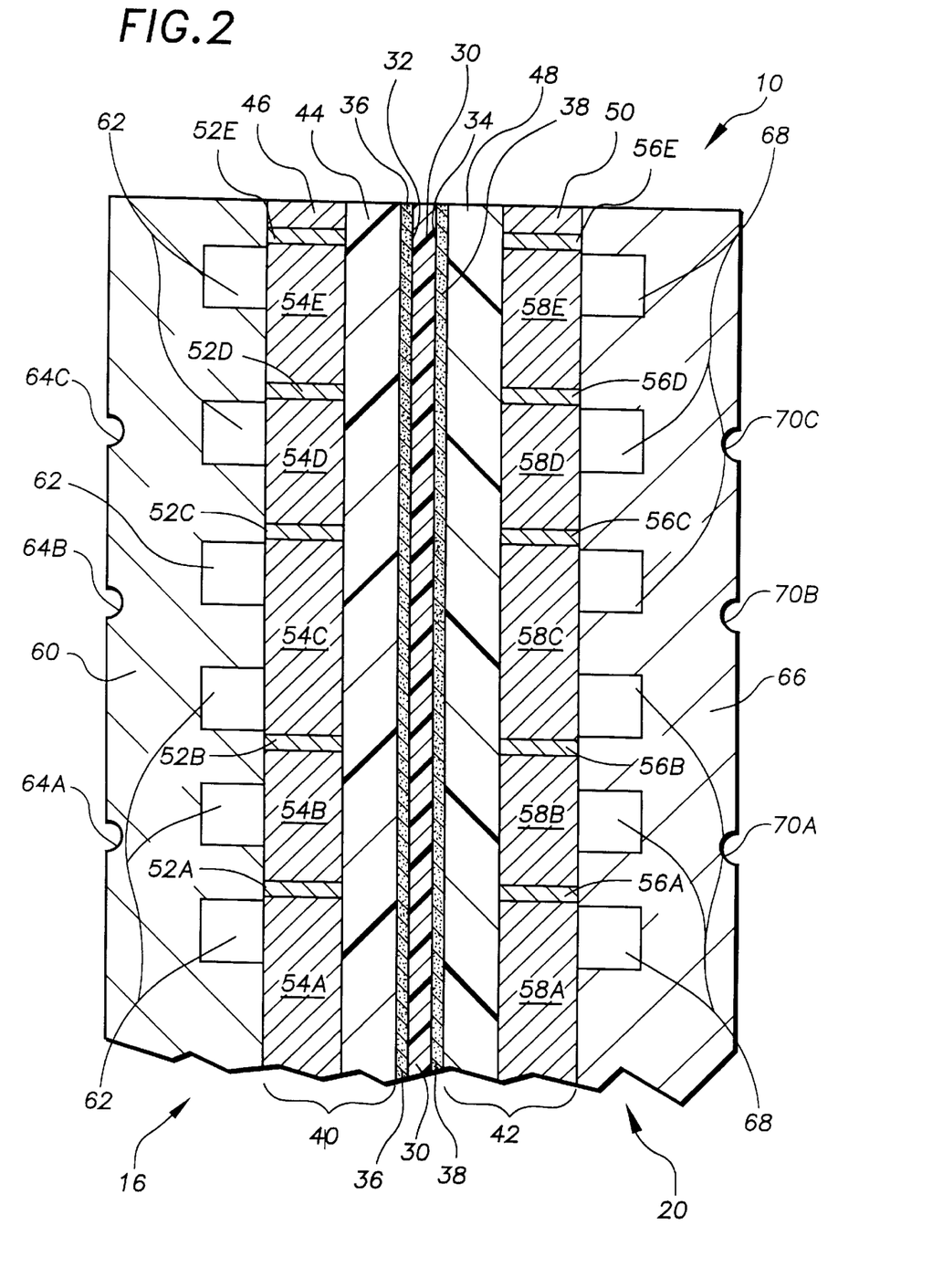
FIG. 2 is a schematic cross-section of a fuel cell employing the porous support plate of the present invention.

Referring to the drawings in detail, an electrochemical cell of the present invention such as a fuel cell is best shown in FIG. 2, and is generally designated by the reference numeral 10. FIG. 1 schematically shows a general and well-known operation of fuel cells including the fuel cell 10 of the present invention, wherein a reducing fluid 12 such as hydrogen or a fuel obtained by reforming a hydrocarbon such as methane or gasoline and water 14 are directed to an anode side 16 of the fuel cell, while an oxidant 18 such as oxygen or air is directed to a cathode side 20 of the cell 10. The reducing fluid electrochemically reacts in a well-known manner to produce protons and electrons, wherein the electrons flow from the anode side 16 through an external load circuit 22 to power an electricity using device 24, such as a transport vehicle, and the protons travel through the cell to the cathode side 20. The electrons then flow through the circuit 22 to the cathode side 20 of the fuel cell 10 to react with the oxidant 18 to form water and heat. Where the fuel cell 10 is powering a transport vehicle (shown schematically at reference numeral 24), it is important to minimize water loss from the cell. Therefore water formed at the cathode side 20 of the cell and any water supplied to the anode side 16 that is dragged through the cell to the cathode side 20 that is not used to cool the cell 10 is directed back to the anode side 16 through a water recycle line 26 that may include a condensing heat exchanger 27. Unused oxidant is directed out of the heat exchanger through an oxidant discharge vent 28, and unused reducing fluid is directed out of the fuel cell 10 through a reducing fluid discharge line 29. Typically the fuel cell 10 is arranged with a plurality of similar cells in a stack that includes a frame (not shown) having manifold and related means for directing flow of reducing, oxidant, and cooling fluids and electricity in a well-known manner.

As best shown in FIG. 2, the fuel cell 10 of the present invention includes an electrolyte such as a proton exchange membrane ("PEM") 30, having a first major surface 32 and an opposed second major surface 34. An anode electrode 36 is supported in intimate contact with the first major surface 32 of the PEM, and a cathode electrode 38 is similarly supported in intimate contact with the second major surface 34 of the PEM. A first porous support plate 40 is secured adjacent the anode electrode 36 and a second porous support plate 42 is secured adjacent the cathode electrode 38. The first porous support plate 40 includes a first contact bi-layer 44 adjacent the anode electrode supported on a first substrate layer 46. The second porous support plate 42 includes a second contact bi-layer 48 adjacent the cathode electrode supported on a second substrate layer 50. As described in more detail below, each contact bi-layer 44, 48 includes a hydrophobic phase defining a network of hydrophobic gas passages, and a hydrophilic phase defining a network of hydrophilic gas passages integrated throughout the contact bi-layers 44, 48. The first substrate layer 46 includes a plurality of discrete hydrophilic regions 52A, 52B, 52C, 52D, 52E, and a plurality of discrete hydrophobic regions 54A, 54B, 54C, 54D, 54E. Similarly, the second substrate layer 50 includes a plurality of discrete hydrophilic regions 56A, 56B, 56C, 56D, 56E, and a plurality of discrete hydrophobic regions 58A, 58B, 58C, 58D, 58E. A first water transport plate 60 is secured adjacent the first substrate layer 46 and it defines a first gas distribution network 62 adjacent the first substrate layer 46, and also defines a plurality of first water feed channels 64A, 64B, 64C. A second water transport plate 66 is secured adjacent the second substrate layer 50 and it also defines a second gas distribution network 68 adjacent the second substrate layer 50, and also defines a plurality of second water feed channels 70A, 70B, 70C. The first and second water transport plates 60, 66 are made of porous materials and are dimensioned to cooperate with water transport plates of adjacent fuel cells (not shown), in a manner well-known in the art wherein the feed water channels of adjacent water transport plates define tunnel-like channels whenever the plates are positioned adjacent each other.

The PEM 30 may be made of a variety of well-known solid polymers used as electrolytes in electrochemical cells, such as a 1.0–10.0 mils. thick layer of a polyflourosulfonic ionomer sold under the brand name "NAFION" by the E.I. DuPont company of Willmington, Del., U.S.A., or a 0.10–10.0 mils. thick layer of the polyflourosulfonic ionomer sold under the brand name "GORE-SELECT" by the W.L. Gore company of Ekton, Md., U.S.A. The anode electrode 36 and the cathode electrode 38 consist of porous layers of catalyst that are typically deposited through techniques well-known in the art on the first and second major surfaces 32, 34 respectively so that they form a concentration of the catalyst on the anode electrode 36 of between 0.05–0.50 mg. per square centimeter, and on the cathode electrode 38 of between 0.1–1.0 mg. per square centimeter. Such catalysts are typically selected from the group consisting of well-known noble metals such as platinum or noble metal alloys that enhance performance of the anode and cathode electrodes in electrochemical cells, such as platinum, cobalt and chromium for the cathode. Where the anode electrode is exposed to reducing fluids containing carbon monoxide or methanol, the catalyst may include a platinum-ruthenium alloy.

The first and second contact bi-layers 44, 48 include hydrophobic phase means for facilitating gas transfer and restricting liquid absorption through a network of hydrophobic gas passages integrated throughout the contact bi-layers, and the first and second contact bi-layers 44, 48 include hydrophilic phase means for facilitating liquid transfer through a network of hydrophilic liquid passages integrated throughout the contact bi-layers 44, 48. The hydrophobic phase means and the hydrophilic phase means include a network of hydrophobic and hydrophilic passages integrated throughout the contact bi-layers wherein the hydrophobic passages are defined by a hydrophobic mixture of carbon black and a hydrophobic polymer such as flourinated ethylene propylene, and the hydrophilic passages are defined by a hydrophilic mixture of carbon black and a proton exchange resin such as a polyflourosulfonic ionomer as described above. The use of the phrase "carbon black" herein is meant to include graphitized carbon black. The characterization herein that the hydrophobic and hydrophilic passages are "integrated" throughout the contact bi-layers 44, 48 means that the passages are distributed randomly throughout the contact bi-layers and the relative proportions of hydrophobic passages to hydrophilic passages is directly related to the relative proportion of the mixture of carbon black and hydrophobic polymer to the proportion of the mixture of carbon black and proton exchange resin within or forming the contact bi-layer.

In preferred embodiments of the contact bi-layers 44, 48, the hydrophobic phase means includes a mixture that is about thirty-five to sixty-five weight per cent of a high structure carbon black and approximately sixty-five to thirty-five weight per cent hydrophobic polymer. An optimal range of high structure carbon black to a hydrophobic polymer is about fifty weight per cent of each. By "high structure" it is meant that the structure is composed of primary aggregates of industrial carbon particles having considerable branching and chaining, as described in more detail in Technical Reports S-131 and S-136 published by the Cabot Corporation Special Blacks Division, of Billerica, Mass., U.S.A. A structure index of such carbon blacks can be quantified by an oil absorption value using a dibutylphthalate ("DBP") standard known in the art and expressed in terms of cubic centimeters per one-hundred grams (cc/100 g), wherein the higher the DBP value, the higher the structure of the carbon black. A good example of such a high structure carbon black appropriate for the hydrophobic phase means is referred to in the trade as "VULCAN-XC72", which is made by the aforesaid Cabot Corporation and has DBP rating of 174–192, and a surface area of about 250 $m^2$/gm. A good example of a hydrophobic polymer is flourinated ethylene propylene which is referred to in the trade by the brand name "FEP-120" as manufactured by the E.I. DuPont company referred to above.

The hydrophilic phase means includes a mixture that is about thirty to seventy weight per cent a carbon black having a low structure and a high surface area and about seventy to thirty per cent a proton exchange resin such as the above identified "NAFION", which may be utilized in a form of a five weight per cent solubilized Nafion, as sold by Solution Technologies, Inc., of Mendenhall, Pa., U.S.A. The carbon black appropriate for the hydrophilic phase has a low structure defined by a DBP rating of about 80–90, and a surface area of about 560 $m^2$/gram. An example of such a low structure, high surface area carbon black appropriate for the hydrophilic phase means is sold under the brand name "MONARCH 1400" by the aforesaid Cabot Corporation.

Carbon particles making up the carbon black contain both internal and external surface areas. A well-known and common nitrogen surface area measurement measures both the external and internal surface areas. The internal surface area is present in very fine micro-pores that are inaccessible to the proton exchange resin and the internal surface areas of the carbon black are therefore not useful for usage as a support structure for the proton exchange resin. The external surface area is approximated by the particle size of the carbon particles making up the carbon black as measured by well-known electron microscope imaging. A preferred carbon black for use as a support of the proton exchange resin in the hydrophilic phase means of the contact bi-layers has a maximum external area per unit volume of carbon particles, which is obtained by selecting a carbon black that has both a small particle size, and a low structure index, as does the above-identified "low structure, high surface area carbon black" appropriate for the hydrophilic phase means. Additionally, the carbon aggregates making up the low structure carbon black will be coated with the proton exchange resin to establish proton conductivity between the carbon particles and the proton exchange resin and between the proton exchange resin and the PEM 30 and thereby further increase the capacitance of the contact bi-layers 44, 48.

The first and second contact bi-layers 44, 48 include between fifty to eighty per cent by volume of the hydrophobic phase means, and between fifty to twenty per cent by volume of the hydrophilic phase means. In a preferred embodiment, the contact bi-layers 44, 48 have a mean pore diameter of about 0.1–1.0 microns.

The first and second substrate layers 46, 50 may be a porous carbon-carbon fibrous composite having approximately sixty-five to seventy-five percent porosity, such as porous carbon material sold under the brand name "GRADE TGP-H-060" by the Toray Company of New York, N.Y., U.S.A. As shown best in FIG. 2, each of the substrate layers 46, 50 may include discrete hydrophilic 52A–52E, 56A–56E and hydrophobic 54A–54E, 58A–58E regions. The hydrophobic or "wetproofed" regions facilitate gas transfer and restrict liquid absorption through the layer by incorporating within the regions hydrophobic compounds such as the above referenced flourinated ethylene propylene or well-known hydrophobic compounds sold under the brand name "TEFLON" by the E.I. Dupont Company identified above.

By characterizing the hydrophobic regions of the first and second substrate layers as "discrete regions", it is to be understood that the regions are distinct from the hydrophobic and hydrophilic phase means of the first and second bi-layers that are "integrated" throughout the contact bi-layers. The phrase "discrete regions" in contrast means that the hydrophobic and hydrophilic regions of the substrate layers 46, 50 are separated from each other.

A method of application of the hydrophobic compounds to the porous carbon-carbon fibrous composite first and second substrate layers 46, 50 includes masking regions of the substrate layers that are to be hydrophilic regions, and then applying a suspension of the hydrophobic compounds to non-masked areas, such as by screen printing in a manner well-known in the art, as disclosed in U.S. Pat. No. 4,038,463 to Lamarine that issued on Jul. 26, 1977 and was assigned to the assignee of the present invention, which Patent is hereby incorporated herein by reference.

In some embodiments of the fuel cell 10 of the present invention, coolant liquid water passing through the water transport plates 60, 66 operates at a pressure differential of about 2–3 p.s.i. less than the reactant fluid 12. That pressure differential displaces most of any liquid water from pores of the substrate layer, thereby facilitating gas transfer while retaining acceptable liquid and gaseous water transfer. In such water-reactant pressure differential embodiments, it is therefore not necessary to have any discrete hydrophobic regions. An additional step to enhance long-term wettability of the substrate layers, 46, 50 is to treat them with a wettability preserving compound selected from a group consisting of compounds that are wettable, have a low solubility, and that are stable within a working environment of known PEM cells, such as aluminum oxide, silicon oxide, with tin oxide being preferred. It is known that carbon structures in PEM cell working environments become hydrophobic in time, especially in the anode side of the cell, due to a reduction of carbon oxides. Consequently, the first and second substrate layers 46, 50 may preferably be treated by application of such a wettability preserving compound as tin oxide. If the wettability preserving compound is tin oxide, it would be applied prior to application of the hydrophobic compounds, while other wettability compounds would be applied based upon their well-known behavior characteristics with respect to the substrate layer and specific hydrophobic compounds applied to the substrate layer.

Application of such a wettability preserving compound as tin oxide may be achieved by immersing for about 15 minutes a substrate layer in a solution of tin tetrachloride pentahydrate dissolved in water to give a concentration of about 0.16 grams of tin oxide per cubic centimeter of water. The saturated substrate is then immersed in a solution of ammonia maintained at a Ph of between about 7 to 9 for about one hour. The substrate is then dried at 180° F. (degrees fahrenheit) for about 15 minutes and heated in air at a temperature of about 400° C. (degrees celsius) for about one hour. The porous substrate layer then includes a wettability preserving compound of about 0.05 grams of tin oxide per gram of substrate layer. In the event the cell 10 is a water-reactant pressure differential cell as described above, the substrate layers would only be treated with the wettabililty preserving compound, and would not need to be treated with the hydrophobic compounds, and therefore, the first and second substrate layers 46, 50 would have no discrete hydrophobic regions.

The first and second water transport plates 60, 66 are also porous and preferably a carbon-carbon composite made from graphite powder phenolic resins by methods well-known to those skilled in the art, wherein the water transport plates 60, 66 have a mean pore diameter of 1–3 microns and a pore volume of about 25–40 per cent.

A method of manufacture of the porous support plates 40, 42 subject to the present invention includes preparing a hydrophobic phase mixture or compound, preparing a hydrophilic phase mixture or compound, combining the hydrophobic and hydrophilic phase compounds to form one of the contact bi-layers 44, 48, and transferring by filtering or depositing the contact bi-layer onto a planar surface of one of the substrate layers 46, 50 to form either the first or second porous support plate 40, 42. Filtering the hydrophobic and hydrophilic phase compounds may be accomplished by standard filter transfer methods well-known in the art wherein suspended particles are filtered out of a suspending liquid to form a layer of the suspended particles. The method may include the further steps of preparing the hydrophobic phase compounds by dispersing in a liquid such as water about thirty-five to sixty-five weight per cent of a high structure carbon black having a DBP rating of greater than 150, adding to the dispersed high structure carbon black between about sixty-five to thirty-five weight per cent a hydrophobic polymer such as a flourinated ethylene propylene (wherein "weight per cent" refers to the weight of the carbon black and hydrophobic polymer only), flocculating of the carbon black and hydrophobic polymer to form a flocculant suspension, preparing the hydrophilic compound by dispersing in a liquid such as water about thirty to seventy weight per cent of a low structure carbon black having a DBP rating of less than 100, adding to the dispersed low structure carbon black between about seventy to thirty weight per cent a proton exchange resin such as a polyflourosulfonic ionomer, flocculating the carbon black and proton exchange resin to form a flocculant suspension, low-speed mixing the flocculated hydrophobic and hydrophilic compounds together, and filter transferring the mixed hydrophobic and hydrophilic compounds onto one of the substrate layers 46, 50.

Preparation of the hydrophobic compound may include the additional steps of a first ultra sound blending of the high structure carbon black dispersed in the water, and a second ultra sound blending of the carbon black, water and hydrophobic polymer mixture, and addition of ions such as aluminum nitrate to assist in flocculation of the carbon black and hydrophobic polymer. Preparation of the hydrophilic compound may likewise include the additional steps of a first ultra sound blending of the low structure carbon black dispersed in water, and a second ultra sound blending of the carbon black, water and proton exchange resin mixture, and addition of sodium hydroxide to assist in flocculation of the carbon black and proton exchange resin. The addition of the sodium hydroxide also converts the NAFION from a hydrogen form to a sodium form to be compatible with subsequent thermal processing. The method of manufacture of the porous support plate also includes additional steps of, after the filtering of the hydrophobic and hydrophilic compounds to form the contact bi-layer step and the transferring the contact bi-layer to the substrate layer step, drying the substrate and contact bi-layer at between one 180°–200° fahrenheit (hereafter "° F.") for about 1–5 minutes, and then heat treating the dried contact bi-layer and substrate layer at a temperature adequate to melt the hydrophobic polymer of the hydrophobic compound so that it adheres to the carbon black of the hydrophobic compound. If the above described "FEP-120" hydrophobic polymer was the selected hydrophobic polymer, the heat treating step would include heating the dried contact bi-layer and substrate layer at between 500° F.–550° F. for about 1–15 minutes. An alternative method of manufacture includes the steps of preparing a hydrophobic phase mixture or compound, preparing a hydrophilic phase mixture or compound, combining the hydrophobic and hydrophilic phase compounds, then drying the combined hydrophobic and hydrophilic phase compounds at between one 180° F.–200° F. for about 1–5 minutes, and then heat treating the dried combined hydrophobic and hydrophilic phase compounds at a temperature adequate to melt the hydrophobic polymer of the hydrophobic compound so that it adheres to the carbon black to thereby form a contact bi-layer.

A method of manufacture of an electrochemical cell incorporating a porous support plate of the present invention includes the aforesaid steps of manufacturing the porous support plate or manufacturing the contact bi-layer, and then laminating the contact bi-layer alone or together with the substrate layer as the porous support plate onto a cathode or anode electrode that is supported in intimate contact with a major surface of an electrolyte, such as the anode electrode 36 and the first major surface 32 of the PEM 30, by placing the contact bi-layer alone or as part of the porous support plate in contact with the anode electrode, applying a pressure of between 100 p.s.i. to 1,000 p.s.i. to the contact bi-layer or plate and anode electrode to secure the contact bi-layer or porous support plate and anode in contact with each other, while heating the contact bi-layer or porous support plate and anode to a temperature of between 350° F. to 400° F. for about 1–5 minutes.

In order to further increase capacitance of the electrochemical cell, the method of manufacture of the porous support plate may also include additional steps of, after the heat treating step, activating the contact bi-layer by wetting it in a 85–100 per cent mineral acid solution, such as a phosphoric acid bath at about 300°–400° F. at a controlled electrical potential of about 1.0–1.6 volts relative to a hydrogen reference electrode for about 0.5–5.0 minutes. Capacitance of an electrochemical cell such as the fuel cell 10 may be further increased by applying the activating step after the steps of transferring the contact bi-layer to the substrate layer and the heat treating step so that the substrate layer is activated, and by activating in the same manner both the first and second porous support plates 40, 42 and both the first and second water transport plates 60, 66. By characterizing the activating steps as increasing the "capacitance" of the porous support plate or fuel cell 10, it is meant that the activating step changes the plate or cell so that they provide a momentary increase in supply of an electrical current in response to a change in voltage generated by the cell. Such a change or increase in capacitance is meant herein to include what is generally referred to as and increase in "double layer capacitance" or "pseudo capacitance".

Figure 3:
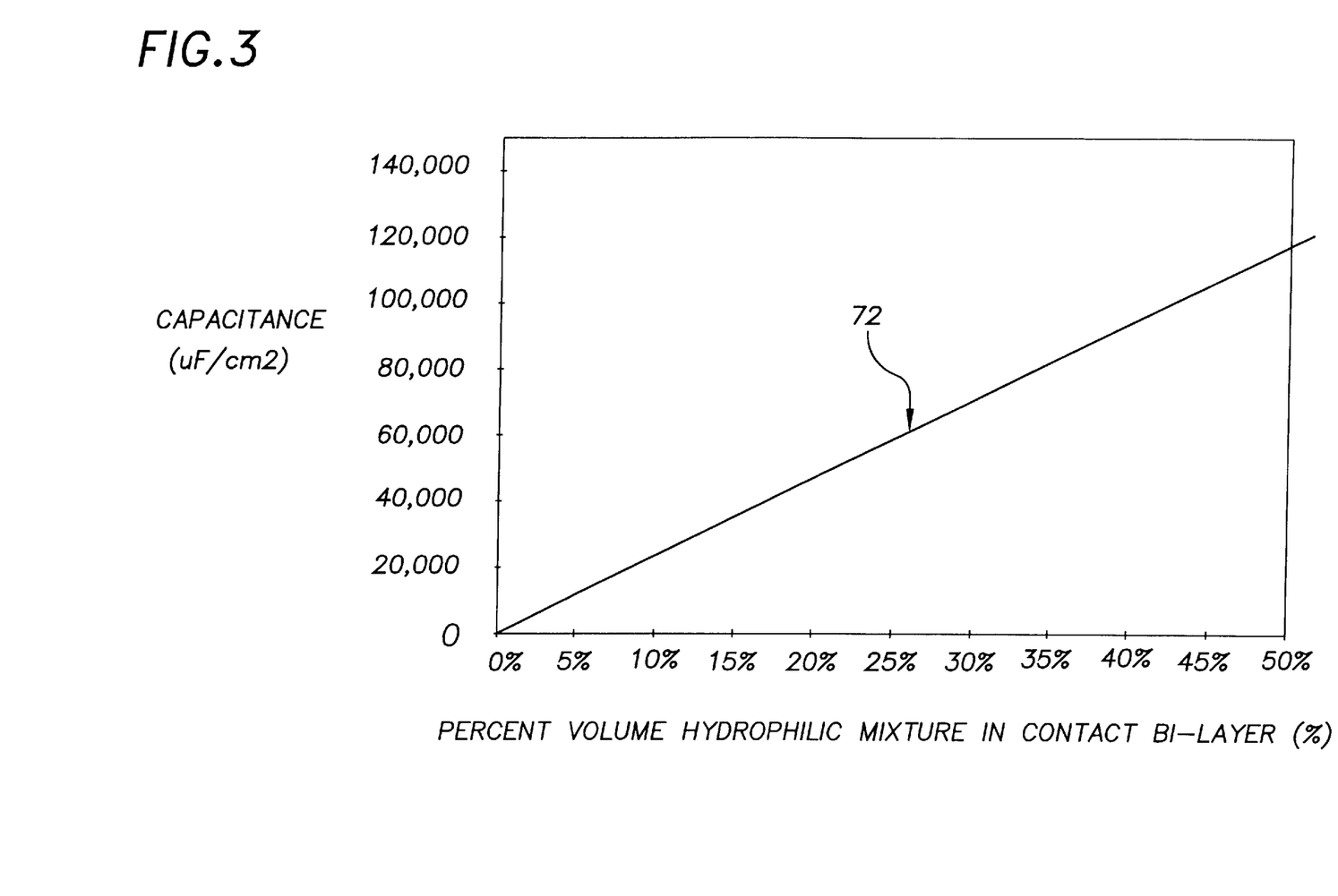
FIG. 3 is a graph showing increased capacitance as a function of one component of a fuel cell employing the porous support plate of the present invention.
Figure 4:
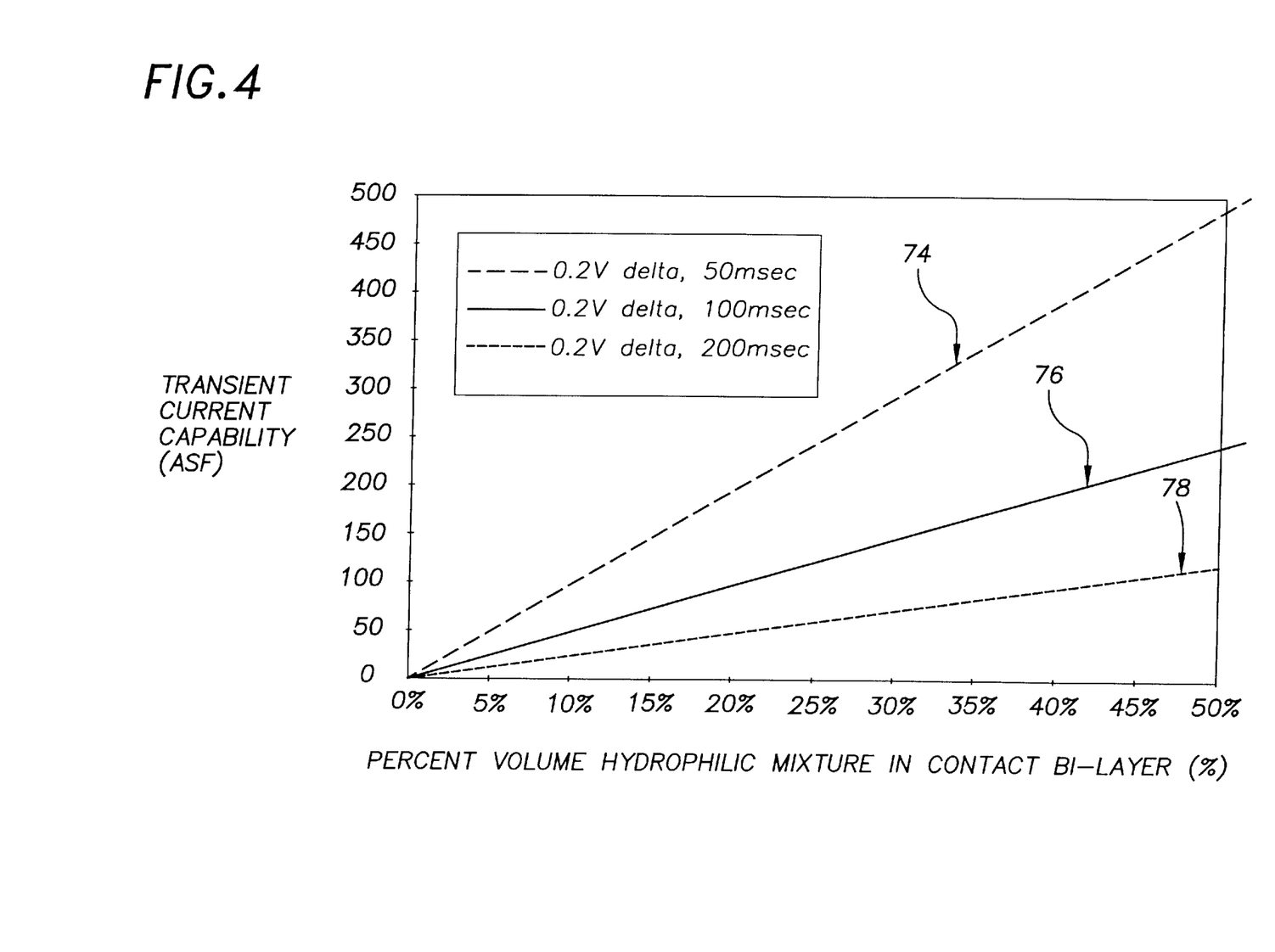
FIG. 4 is a graph showing increased transient current capability as a function of one component of a fuel cell employing the porous support plate of the present invention.

Increased capacitance of a fuel cell constructed in accordance with the present invention is estimated with results shown in FIGS. 3 & 4. The estimate uses the above-described MONARCH 1400 product as the carbon black in hydrophilic phase, having a DBP rating of about 80 cc/100 gm (referred to as a "low structure index"), a surface area of about 250 $m^2$/gm, and a capacitance of 10 microfarads per square centimeter. The graph in FIG. 3 shows at reference numeral 72 how increased "Capacitance (Uf/$cM^2$)" is increased as a "Percent Volume of Hydrophilic Mixture in Contact Bi-Layer (%)" is increased. The graph in FIG. 4 shows increased transient current density or "Transient Current Capability (ASF)" that can be supported as a function of a "Percent Hydrophilic Mixture in a Contact Bi-Layer" at a 0.2 volt demand for transient times of 50 milliseconds at reference numeral 74, for 100 milliseconds at reference numeral 76, and for 200 milliseconds at reference numeral 78. A rated current density of a typical PEM cell for a transportation vehicle is about 500 ASF (amps/ft$^2$). A contact bi-layer with a 25 percent hydrophilic mixture therefore would have an enhanced transient current density capability of approximately 125 ASF for 100 millisecond of current demand, which is equal to about one-quarter a steady state load of the cell.

An electrochemical cell constructed in accordance with the above disclosure will significantly enhance fluid transport throughout the cell while also increasing capacitance of the cell thereby maintaining an efficient water balance so that the risk of the anode electrode 36 drying out or the cathode electrode becoming flooded at high current output is minimized. Consequently, an electrochemical cell such as the fuel cell 10 utilizing porous support plates 40, 42 of the present invention will substantially increase effective and transient current output capacity of the cell 10 without a proportionate increase in size, weight and cost of the cell.

While the present invention has been described and illustrated with respect to a particular construction and method of manufacture of an electrochemical cell with a porous support plate, it is to be understood that the present invention is not limited to the described and illustrated examples. For example, the first and second porous support plates 40, 42 have been described and shown adjacent to the anode and cathode electrodes 36, 38. However it is possible that they may be separated from each other by intermediary layers (not shown), but the first porous support plate 40 would remain in fluid communication with the anode electrode 36, and the second porous support plate would remain in fluid communication with the cathode electrode 38. Accordingly, reference should be made primarily to the attached claims rather than the foregoing description to determine the scope of the invention.

What is claimed is:

1. An electrochemical cell, comprising:
    a. an electrolyte held within a porous non-conductive matrix having a first major surface and an opposed second major surface;
    b. an anode electrode supported in intimate contact with the first major surface and a cathode electrode supported in intimate contact with the second major surface; and
    c. at least one porous support plate including a contact bi-layer adjacent the anode or cathode electrode supported on a porous substrate layer, wherein the contact bi-layer includes hydrophobic phase means for facilitating gas transfer and for restricting liquid absorption through a network of hydrophobic gas passages integrated throughout the contact bi-layer and the contact bi-layer also includes hydrophilic phase means for facilitating liquid transfer through a network of hydrophilic liquid passages integrated throughout the contact bi-layer, and for increasing capacitance of the cell.

2. The electrochemical cell of claim 1, wherein the hydrophobic phase means includes hydrophobic gas passages defined by a mixture of carbon black and a hydrophobic polymer and the hydrophilic phase means includes hydrophilic liquid passages defined by a mixture of carbon black and a proton exchange resin.

3. The electrochemical cell of claim 2, wherein the mixture of carbon black and a hydrophobic polymer comprises a mixture of about thirty-five to sixty-five weight per cent of a high structure carbon black and about sixty-five to thirty-five weight per cent of the hydrophobic polymer.

4. The electrochemical cell of claim 3, wherein the mixture of carbon black and a proton exchange resin includes about thirty to seventy weight per cent of a low structure, high surface area carbon black and about seventy to thirty weight per cent of the proton exchange resin.

5. The electrochemical cell of claim 4, wherein the contact bi-layer includes about fifty to eighty per cent by volume of the hydrophobic phase means and about fifty to twenty per cent by volume of the hydrophilic means.

6. The electrochemical cell of claim 5, wherein the substrate layer includes discrete hydrophobic regions and discrete hydrophilic regions wherein the hydrophobic regions include hydrophobic compounds to facilitate gas transfer and restrict liquid absorption through the hydrophobic regions.

7. The electrochemical cell of claim 6, wherein the cell is a fuel cell and the electrolyte is a proton exchange membrane.

8. A fuel cell for producing electrical energy from reactant and oxidant fluids, comprising:
    a. a proton exchange membrane having a first major surface and an opposed second major surface;
    b. an anode electrode supported in intimate contact with the first major surface and a cathode electrode supported in intimate contact with the second major surface; and,
    c. at least one porous support plate including a contact bi-layer in fluid communication with the anode or cathode electrode supported on a porous substrate layer, wherein the contact bi-layer includes a hydrophobic mixture that defines a network of hydrophobic gas passages integrated throughout the contact bi-layer for facilitating gas transfer and for restricting liquid absorption and the contact bi-layer also includes a hydrophilic mixture that defines a network of hydrophilic liquid passages integrated throughout the contact bi-layer for facilitating liquid transfer, and for increasing capacitance of the cell.

9. The fuel cell of claim 8, wherein the hydrophobic mixture further comprises a mixture of carbon black and a hydrophobic polymer and the hydrophilic mixture further comprises a mixture of carbon black and a proton exchange resin.

10. The fuel cell of claim 9, wherein the mixture of carbon black and a hydrophobic polymer further comprises a mixture of about thirty-five to sixty-five weight per cent of a high structure carbon black and about sixty-five to thirty-five weight per cent of the hydrophobic polymer.

11. The fuel cell of claim 9, wherein the mixture of carbon black and a proton exchange resin further comprises about thirty to seventy weight per cent of a low structure, high surface area carbon black and about seventy to thirty weight per cent of the proton exchange resin.

12. The fuel cell of claim 8, wherein the contact bi-layer includes about fifty to eighty per cent by volume of the hydrophobic mixture and about fifty to twenty per cent by volume of the hydrophilic mixture.

13. The fuel cell of claim 8, wherein the porous substrate layer includes discrete hydrophobic regions and discrete hydrophilic regions wherein the hydrophobic regions include hydrophobic compounds to facilitate gas transfer and restrict liquid absorption through the hydrophobic regions.

14. The fuel cell of claim 8, wherein the porous substrate layer includes a wettability preserving compound so that a pressure differential between a coolant liquid water supplied through a water transport plate and the reactant fluid displaces most liquid water from pores within the substrate to facilitate gas transfer and retain some liquid water transfer through the substrate layer.

* * * * *